(12) United States Patent
De Souza Filho

(10) Patent No.: US 8,734,070 B2
(45) Date of Patent: May 27, 2014

(54) TOOLHOLDER WITH EXTERNALLY-MOUNTED DYNAMIC ABSORBER

(75) Inventor: Ruy Frota De Souza Filho, Latrobe, PA (US)

(73) Assignee: Kennametal Inc., Latrobe, PA (US)

( * ) Notice: Subject to any disclaimer, the term of this patent is extended or adjusted under 35 U.S.C. 154(b) by 733 days.

(21) Appl. No.: 12/908,148

(22) Filed: Oct. 20, 2010

(65) Prior Publication Data

US 2012/0099940 A1   Apr. 26, 2012

(51) Int. Cl.
*B23Q 11/00* (2006.01)

(52) U.S. Cl.
USPC .................................. 409/141; 408/143

(58) Field of Classification Search
USPC .................................. 409/141; 408/143
See application file for complete search history.

(56) References Cited

U.S. PATENT DOCUMENTS

| | | |
|---|---|---|
| 2,051,954 A | 8/1936 | Leland |
| 3,242,791 A | 3/1966 | Smith |
| 3,447,402 A | 6/1969 | Ray |
| 3,486,585 A | 12/1969 | Richter et al. |
| 3,582,226 A | 6/1971 | Shurtliff |
| 3,598,498 A | 8/1971 | Holmen |
| 3,643,546 A | 2/1972 | Richter et al. |
| 3,774,730 A | 11/1973 | Maddux |
| 3,838,936 A | 10/1974 | Andreassen et al. |
| 4,197,771 A | 4/1980 | Heaton et al. |
| 4,554,884 A | 11/1985 | Fitzgerald et al. |
| 4,784,543 A | 11/1988 | Mitchell et al. |
| 4,817,003 A | 3/1989 | Nagase et al. |
| 5,095,786 A * | 3/1992 | Bellinghausen et al. ....... 82/112 |
| 5,170,103 A | 12/1992 | Rouch et al. |
| 5,228,813 A | 7/1993 | Scheer et al. |
| 5,413,318 A | 5/1995 | Andreassen |
| 5,518,347 A | 5/1996 | Cobb, Jr. |
| 5,681,651 A | 10/1997 | Yoshimura et al. |
| 5,700,116 A | 12/1997 | Cobb, Jr. |
| 5,810,528 A | 9/1998 | O'Connor et al. |

(Continued)

FOREIGN PATENT DOCUMENTS

| | | | |
|---|---|---|---|
| CN | 201070679 Y * | 6/2008 | .............. B23B 29/02 |
| EP | 900860 A2 | 3/1999 | |

(Continued)

OTHER PUBLICATIONS

Aste Tool Engineers Handbook, McGraw Hill Book Co., New York, New York (1949), pp. 302-315.

(Continued)

*Primary Examiner* — Andrea Wellington
*Assistant Examiner* — Michael Vitale
(74) *Attorney, Agent, or Firm* — Larry R. Meenan, Esq.

(57) ABSTRACT

A toolholder includes a body portion having an exterior surface and a dynamic absorber mounted on the exterior surface of the body portion. The dynamic absorber includes a rigid support member, a cover member, and an absorber mass disposed within a cavity formed by the rigid support member and the cover member. A first resilient support member is disposed between the rigid support member and the absorber mass, and a second resilient support member is disposed between the cover member and the absorber mass. The dynamic absorber is tuned by moving the cover member relative to the rigid support member. A method of suppressing vibrations of the toolholder includes externally mounting the dynamic absorber on the exterior surface of the toolholder.

10 Claims, 4 Drawing Sheets

(56) References Cited

U.S. PATENT DOCUMENTS

| | | |
|---|---|---|
| 5,915,162 A | 6/1999 | Uchino et al. |
| 6,033,161 A | 3/2000 | Scheufler, Jr. |
| 6,082,236 A | 7/2000 | Andreassen |
| 6,135,684 A * | 10/2000 | Senzaki .................. 409/234 |
| 6,183,846 B1 | 2/2001 | Moriguchi et al. |
| 6,187,421 B1 | 2/2001 | Moriguchi et al. |
| 6,415,696 B1 | 7/2002 | Erickson et al. |
| 6,436,519 B2 | 8/2002 | Holzschuh |
| 6,443,673 B1 | 9/2002 | Etling et al. |
| 6,557,445 B1 * | 5/2003 | Ishikawa .................. 82/158 |
| 6,627,335 B2 | 9/2003 | Kodama et al. |
| D508,507 S | 8/2005 | Oettle |
| 7,172,807 B2 | 2/2007 | Fukano et al. |
| 7,192,660 B2 | 3/2007 | Ruppi |
| 7,455,918 B2 | 11/2008 | Gates, Jr. et al. |
| 8,080,312 B2 | 12/2011 | McNerny et al. |
| 8,080,323 B2 | 12/2011 | Ban et al. |
| 2003/0147707 A1 | 8/2003 | Perkowski |
| 2003/0170084 A1 * | 9/2003 | Bergholt et al. ............. 408/143 |
| 2004/0108443 A1 | 6/2004 | Ivers et al. |
| 2005/0109182 A1 | 5/2005 | Murakami et al. |
| 2005/0262975 A1 | 12/2005 | Lundblad |
| 2006/0037822 A1 | 2/2006 | McFarland et al. |
| 2006/0115662 A1 | 6/2006 | Ruppi |
| 2006/0257689 A1 | 11/2006 | Sottke et al. |
| 2006/0275090 A1 | 12/2006 | Onozuka et al. |
| 2007/0298280 A1 | 12/2007 | Omori et al. |
| 2008/0060472 A1 * | 3/2008 | Yamamoto .................. 74/571.1 |
| 2009/0257838 A1 | 10/2009 | Ostermann et al. |

FOREIGN PATENT DOCUMENTS

| | | | |
|---|---|---|---|
| EP | 709484 B1 | 4/1999 | |
| EP | 685572 B1 | 7/2000 | |
| EP | 732423 B1 | 6/2001 | |
| EP | 1138800 A1 | 10/2001 | |
| EP | 1160353 A1 | 12/2001 | |
| EP | 1157143 B1 | 11/2002 | |
| EP | 1188504 B1 | 11/2004 | |
| EP | 1413648 B1 | 6/2005 | |
| JP | 2004066350 A * | 3/2004 | ............. B23Q 3/12 |
| JP | 2004-358613 A | 12/2004 | |
| JP | 2005118929 A * | 5/2005 | ............. B23B 29/02 |
| JP | 2005-186240 A | 7/2005 | |
| SU | 990427 A * | 1/1983 | ............. B23B 29/03 |
| WO | 0052224 A1 | 9/2000 | |
| WO | 2009/101709 A1 | 8/2009 | |

OTHER PUBLICATIONS

Moltrecht, Machine Shop Practice, New York, NY (1981), pp. 199-204.

* cited by examiner

TOOLHOLDER WITH EXTERNALLY-MOUNTED DYNAMIC ABSORBER

BACKGROUND OF THE INVENTION

During a metal cutting operation, any vibration between a cutting tool and a workpiece may lead to undesirable cutting performances, such as poor surface finish and out-of-tolerance finished workpieces. Furthermore, such vibration may cause the cutting tool, or the associated machine tool, to become damaged.

To reduce this vibration, cutting speed can be decreased. However, this approach reduces metal removal rates, thereby negatively impacting productivity.

Another approach is to internally mount an absorber mass within a cavity of the shank. In one design, a resilient support circumscribes each end of the absorber mass to suspend the absorber mass within the cavity. A pressure plate is positioned adjacent the resilient support and is movable along the longitudinal axis to compress each resilient support against the absorber mass. An adjustment screw is used to displace the movable pressure plate along the longitudinal axis to shift the position of the absorber mass to alter the stiffness of the resilient support to change the dynamic response of the toolholder.

Although positioning an absorber mass within the cavity of the shank suppresses vibrations, the requirement of mounting the absorber mass within the cavity of the shank undesirably reduces the overall stiffness of the toolholder. In addition, the size of the absorber mass is limited to the size of the cavity, and therefore the vibration absorber may not be used for larger toolholder designs that require a larger absorber mass.

SUMMARY OF THE INVENTION

The problem of suppressing vibrations of a toolholder without reducing the overall stiffness of the toolholder is solved by externally mounting a dynamic absorber on an exterior surface of the toolholder, rather than internally mounting the absorber mass in a cavity of the shank as in a conventional toolholder. Ideally, the dynamic absorber is mounted on the toolholder where the amplitude of vibration of the toolholder is maximum.

In one aspect, a toolholder comprises a body portion having an exterior surface, and a dynamic absorber mounted on the exterior surface of the body portion.

In another aspect, a method of suppressing vibrations of a toolholder comprises externally mounting a dynamic absorber on an exterior surface of the toolholder.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
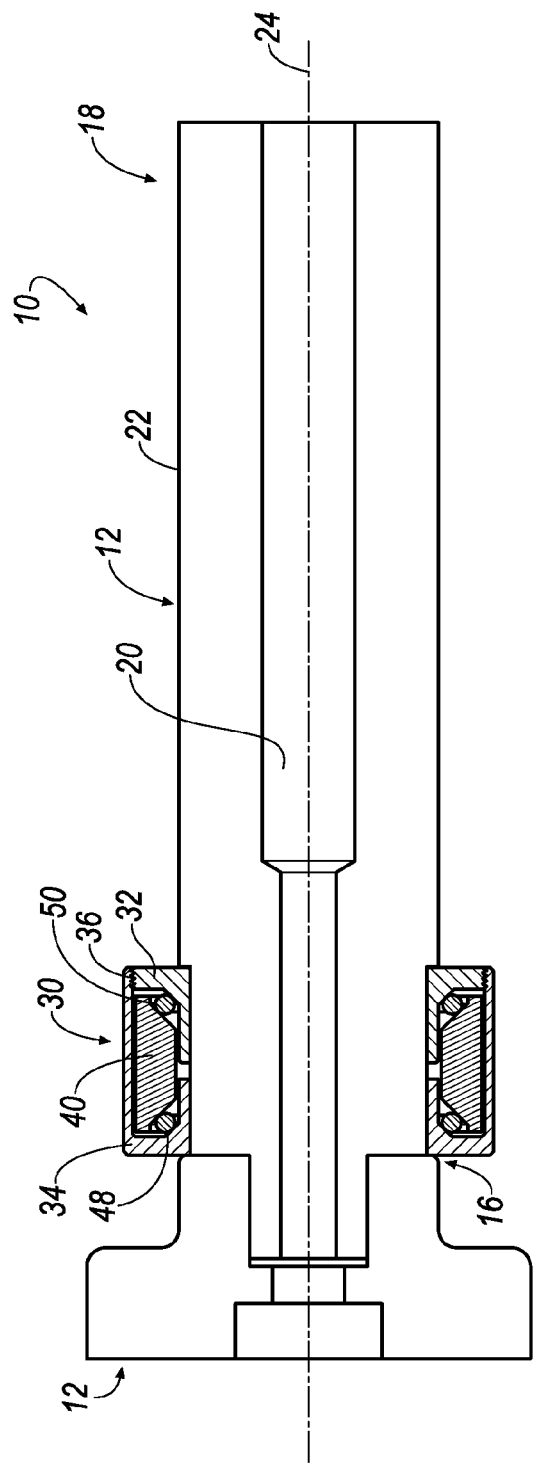
FIG. 1 is a cross-sectional view of a toolholder with an externally-mounted dynamic absorber according to an embodiment of the invention for a cutting tool, for example, a milling cutter.
Figure 2:
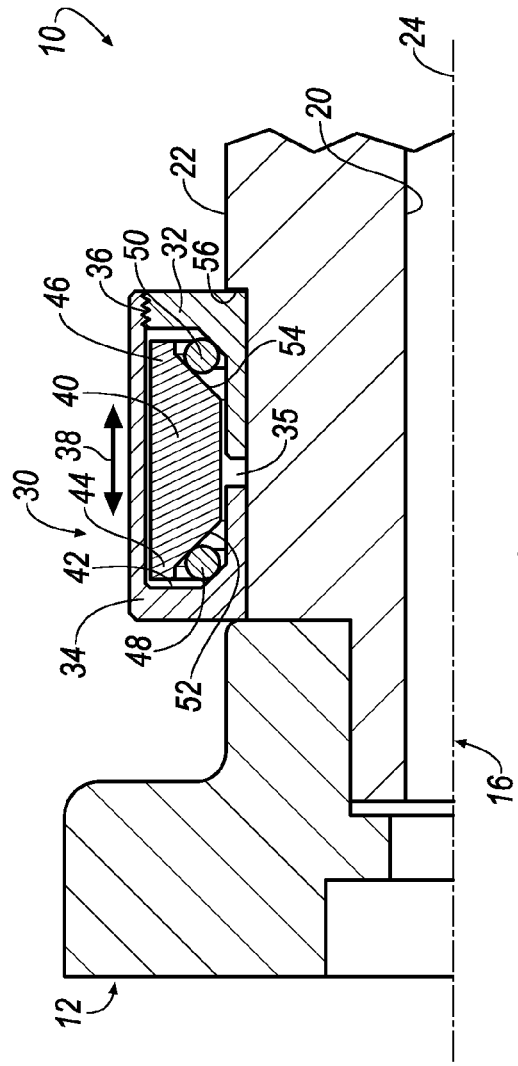
FIG. 2 is a partial, enlarged cross-sectional view of the toolholder with the externally-mounted dynamic absorber shown in FIG. 1.

Referring now to FIGS. 1 and 2, a toolholder 10 is generally shown according to an embodiment of the invention. In the illustrated embodiment, the toolholder 10 is used with a cutting tool 12, such as a milling cutter at one end thereof. However, it will be appreciated that the toolholder 10 can be used with any desirable cutting tool for metalworking operations, such as an end mill, and the like.

The toolholder 10 includes a substantially cylindrically-shaped body portion 14 with a front end 16 proximate the milling cutter 12 and a rear end 18 distal the milling cutter 12. The toolholder 10 may include an optional internal cavity 20 that extends the entire length of the body portion 14 from the rear end 18 to the front end 16 and serves as a coolant channel for delivering coolant to the cutting tool 12. The body portion 12 includes an outer surface or exterior surface 22 exposed to the environment, and a central, longitudinal axis 24.

One aspect of the invention is that the toolholder 10 includes a dynamic absorber, shown generally at 30, mounted on the outer or exterior surface 22 of the toolholder 10. In the illustrated embodiment, the dynamic absorber 30 is in the form of an annular ring that is mounted on the exterior surface 22 proximate the front end 16 of the toolholder 10 and is proximate the cutting tool 12.

The dynamic absorber 30 includes a rigid support member 32 and a cover member 34. In the illustrated embodiment, the rigid support member 32 is mounted on the outer surface 22 such that the rigid support member 32 does not move axially in a direction along the longitudinal axis 24 of the toolholder 10. To further prevent axial movement of the rigid support member 32, the outer surface 22 may include a ledge 56 that abuts the rigid support member 32. The rigid support member 32 may be threaded onto the outer surface 22. Both the rigid support member 32 and the cover member 34 include threads 36 such that the cover member 34 can be threaded onto the rigid support member 32 by rotating the cover member 34 about the longitudinal axis 24. The dimensions of the rigid support member 32 and the cover member 34 are such there is a clearance gap 35 between both the members 32, 34 to allow the cover member 34 to move relative to the rigid support member 32. The relative movement between the rigid support member 32 and the cover member 34 is achieved by rotating the cover member 34 about the longitudinal axis 24 of the toolholder 10. As the cover member 34 is rotated, the cover member 34 moves along the longitudinal axis 24 of the toolholder 10 in the direction of the arrows 38, depending on the direction of rotation. For example, the cover member 34 may move to the right (as shown by the right arrow in FIG. 2) when rotated in a clockwise direction (when viewed from the front end 16), and moves to the left (as shown by the left arrow in FIG. 2) when rotated in the opposite, counter-clockwise direction (when viewed from the front end 16).

The dynamic absorber 30 also includes an absorber mass 40 disposed within a cavity 42 formed by the rigid support member 32 and the cover member 34. The absorber mass 40 has a first end 44 and a second end 46. A first resilient support 48 is proximate the first end 44 of the absorber mass 40, and is positioned between the cover member 34 and an angled surface 52 of the absorber mass 40 to suspend the absorber mass 40 within the cavity 42. A second resilient support 50 is proximate the second end 46 of the absorber mass 40, and is positioned between the rigid support member 32 and an angled surface 54 of the absorber mass 40 to suspend the absorber mass 40 within the cavity 42.

The toolholder 10 can be finely tuned by moving the cover member 34 relative to the rigid support member 32 in either direction along the longitudinal axis 24 of the toolholder 10. As the cover member 34 moves to the right (as viewed in FIG. 2), the cover member 34 exerts more pressure against the first resilient support 48. In turn, the absorber mass 40 will be urged more against the second resilient support 50, which is then urged more against the rigid support member 32 to provide more compression of both the first resilient support 48 and the second resilient support 50 against the absorber mass 40. Oppositely, as the cover member 34 moves to the left (as viewed in FIG. 2), the cover member 34 exerts less pressure against the first resilient support 48. In turn, the absorber mass 40 will be urged less against the second resilient support 50, which is then is urged less against the rigid support member 32 to provide less compression of both the first resilient support 48 and the second resilient support 50 against the absorber mass 40. The rigid support member 32 and the cover member 34 eliminates the need for pressure plate and adjustment screws that are commonly found in conventional designs, thereby providing a simpler, more cost-effective design.

Figure 3:
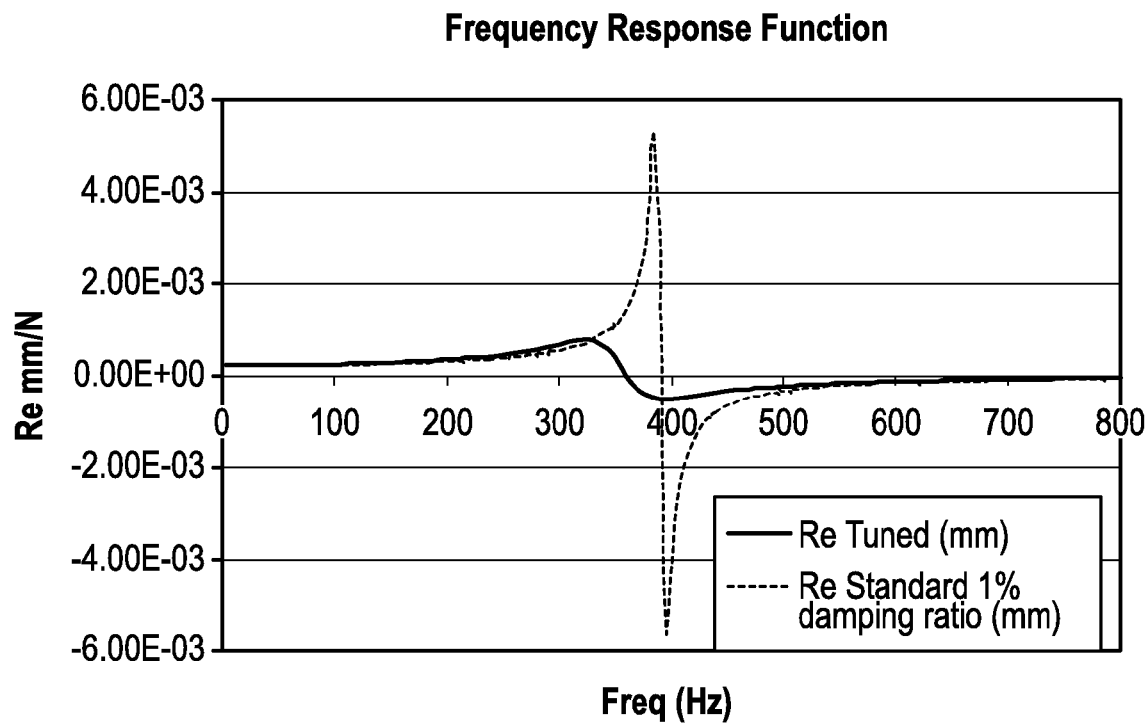
FIG. 3 is a graphical representation of the frequency response function from a simulation using the toolholder with externally-mounted dynamic absorber shown in FIG. 1.
Figure 4:
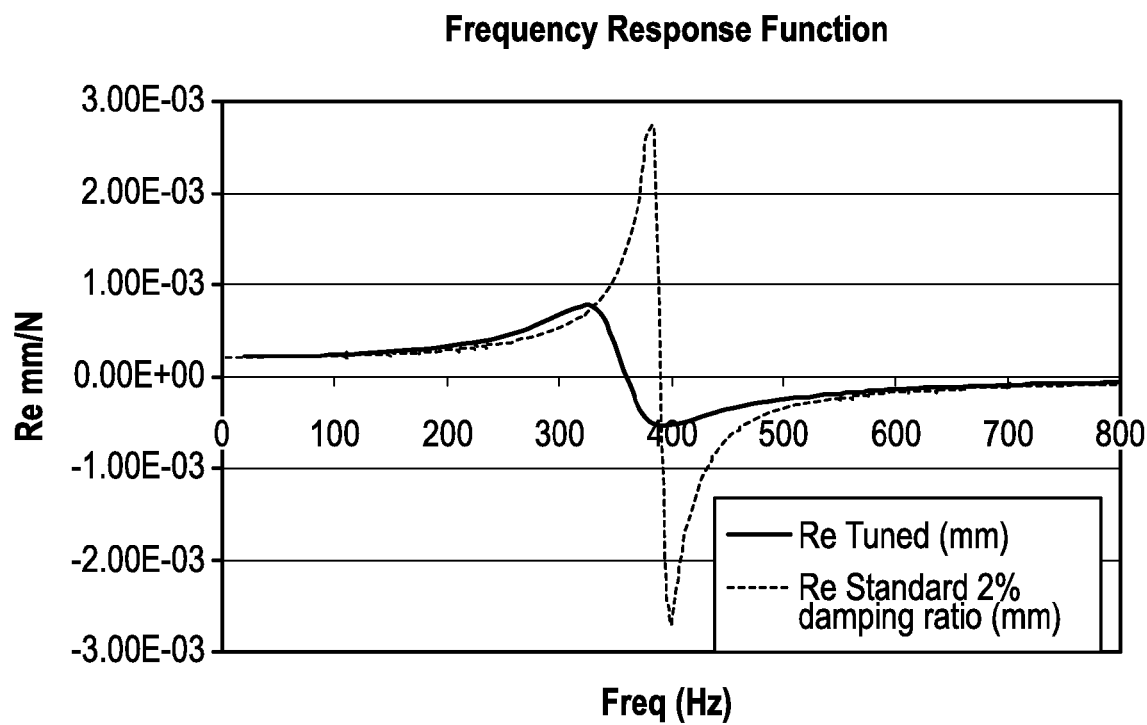
FIG. 4 is another graphical representation of the frequency response function from a simulation using the toolholder with externally-mounted dynamic absorber shown in FIG. 1.

FIGS. 3 and 4 are graphical representations of the frequency response function from a simulation of the toolholder 10 with the externally-mounted dynamic absorber 30 of the invention. As can be seen in FIGS. 3 and 4, the results show that the toolholder 10 with the externally-mounted dynamic absorber 30 provides superior results, as compared to a toolholder with standard 1% and 2% damping ratios, respectively.

In practice, the absorber mass 40 should be positioned on the toolholder where the amplitude of vibration is maximum so that the damping effect can be maximized. For example, the maximum amplitude of vibration of the toolholder 10 for a milling cutter may be located proximate the front end 16 of the toolholder. In another example, the maximum amplitude of vibration of a toolholder for an end mill cutter may be located proximate the rear end.

Figure 5:
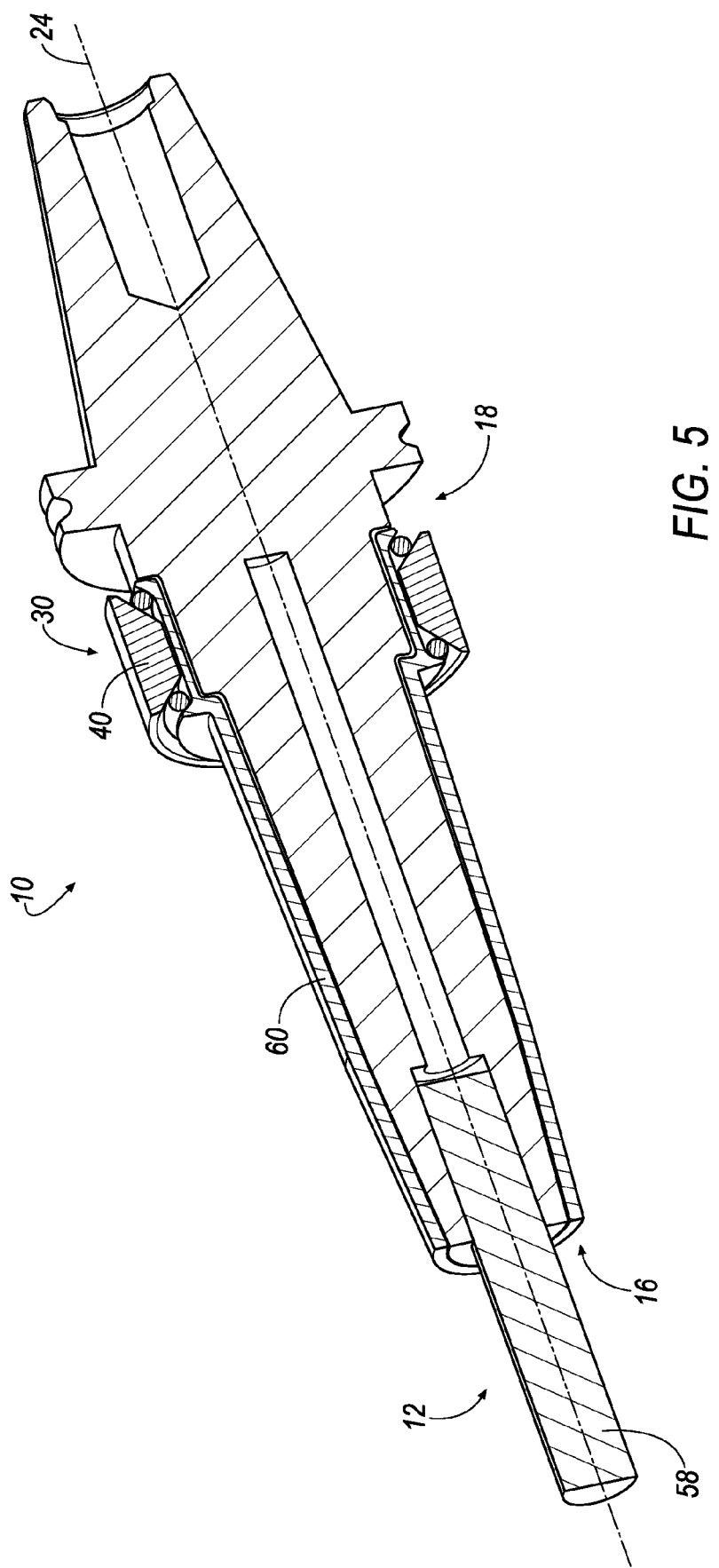
FIG. 5 is a cross-sectional view of a toolholder with an externally-mounted dynamic absorber at the rear part of the toolholder according to an embodiment of the invention.

As stated above, the principles of the externally-mounted dynamic absorber 30 can be applied to many different toolholder designs. Referring now to FIG. 5, a toolholder 10 with the externally-mounted dynamic absorber 30 for an end mill cutter is shown.

Unlike the earlier embodiment, the toolholder 10 shown in FIG. 5 includes a shank 58 mounted to the front end 16 of the toolholder 10. In addition, the toolholder 10 includes a sleeve 60 circumferentially disposed about a portion of the body portion 14 of the toolholder 10. The sleeve 60 is made of a rigid material, such as metal, plastic, and the like. The sleeve 60 has a purpose of creating a location to place the dynamic absorber 30 where the amplitude of vibration (i.e., displacement) of the toolholder 10 is maximum. In this particular case, if a conventional internal dynamic absorber is used, the dynamic absorber will need to be placed behind the end mill, or in the middle of the toolholder, where the amplitude of vibration is much smaller than the amplitude at the tool tip (point of interest). By using the sleeve 60, which is only connected to a portion of the toolholder 10, a pivot point is created that causes the sleeve 60 to freely vibrate at the point where the absorber mass 40 will be placed. In this case, the sleeve 60 works like a "see-saw" such that the back portion of the sleeve 60 proximate the rear end 18 of the toolholder 10 moves in an opposite direction than the shank 58, but with a higher amplitude of vibration. As a result, the sleeve 60, in conjunction with the dynamic absorber, provides improved damping capability, as compared to a conventional solid toolholder where an internally-mounted dynamic absorber at the same axial location.

It will be appreciated that the sleeve 60 can be used in the earlier embodiment of the toolholder 10 for the milling cutter, and also will other toolholder types, and the invention is not limited by the use of the sleeve 60 in the toolholder 10 of the illustrated embodiment.

Figure 6:
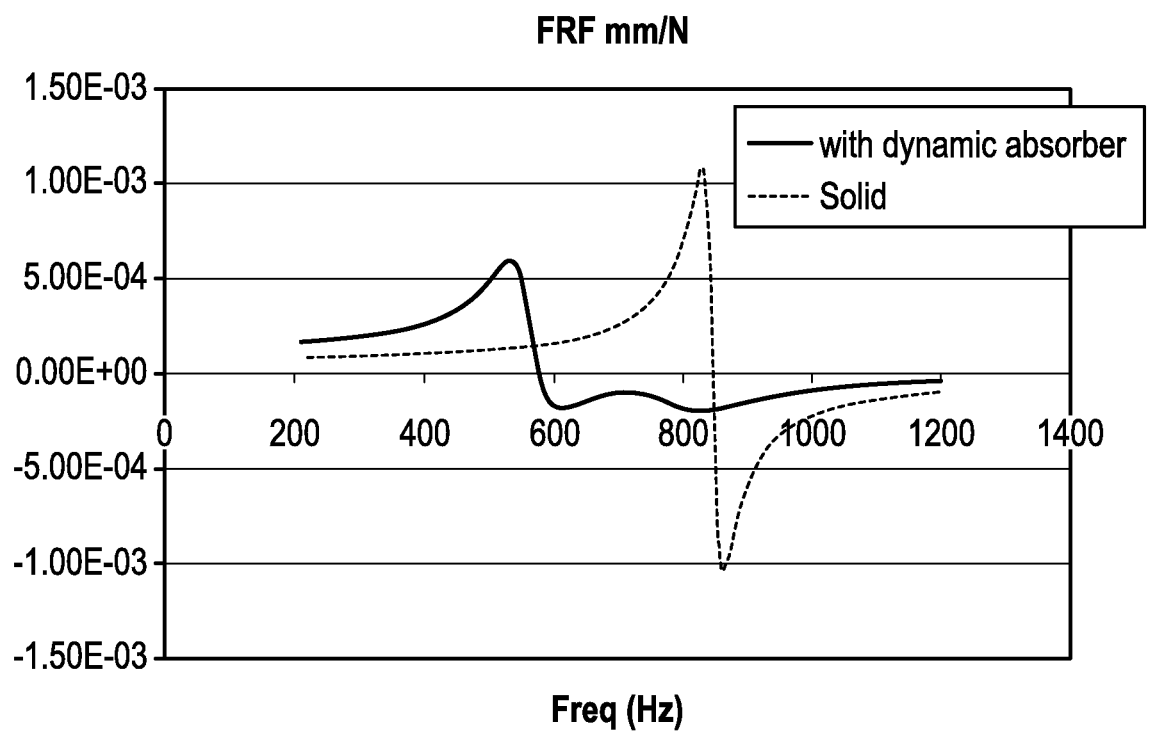
FIG. 6 is a graphical representation of the frequency response function from a simulation using the toolholder with the externally-mounted dynamic absorber shown in FIG. 5.

FIG. 6 is a graphical representation of the frequency response function from a simulation of the toolholder 10 for an end mill cutter with the externally rear-mounted dynamic absorber 30 of the invention. The results show that the toolholder 10 with the externally rear-mounted dynamic absorber 30 provides superior results as compared to a solid toolholder without the dynamic absorber. The results further show that if the absorber mass 40 is placed where the amplitude of vibration is maximum, and tuned properly to the proper frequency, the amplitude of vibration for the sleeve 60 will be greatly minimized, thus reducing the vibration of the shank 58, which is one of the main objectives of the invention.

One advantage of the dynamic absorber 30 is that there is generally no reduction in stiffness of the toolholder 10 because the absorber mass 40 is not located in an internal cavity of the toolholder, which requires a reduction in the cross-sectional moment of inertia. In FIG. 6, a reduction of stiffness for the solid toolholder 10 can be noticed as the natural frequency moves from about 850 Hertz to about 600 Hertz as the diameter of the body was slightly reduced to add the sleeve 60, yet maintaining the external diameter of the toolholder 10. The toolholder 10 represented in FIG. 5 was also elongate in order to maintain the same useful length when clearance with a workpiece (not shown) can be a problem. Even with the reduction in rigidity, the toolholder 10 shown in FIG. 5 has a much higher dynamic stiffness than a solid end mill holder or shrink fit holder. The gain in dynamic stiffness of the toolholder 10 is about 10-20 times when compared to a standard toolholder with 1% damping, and about 5-10 times when compared to a standard toolholder with 2% damping. In addition, the externally-mounted dynamic absorber 30 of the invention allows for the size of the absorber mass 40 to be optimized for larger cutting tools with no reduction in the overall stiffness of the toolholder 10.

Another advantage is that the dynamic absorber 30 of the invention can be applied to many different toolholder types, unlike conventional designs in which the absorber mass is internally mounted within the toolholder. For example, the dynamic absorber 30 of the invention allows the application of a tunable mass on a shell mill toolholder with minor changes. The dynamic absorber 30 of the invention can also be adapted to an end mill adapter, a slotting cutter, a shrink fit toolholder, and the like, where vibration damping is known to be poor. In addition, the principles of the invention can be applied to extensions and reducers for a modular tool.

The patents and publications referred to herein are hereby incorporated by reference.

Having described presently preferred embodiments the invention may be otherwise embodied within the scope of the appended claims.

What is claimed is:

1. A toolholder comprising:
a body portion having an exterior surface; and
a dynamic absorber mounted on the exterior surface of the body portion,
wherein the dynamic absorber includes a rigid support member, a cover member, and an absorber mass disposed within a cavity formed by the rigid support member and the cover member, and
wherein the dynamic absorber further includes a first resilient support member disposed between the rigid support member and the absorber mass, and a second resilient support member disposed between the cover member and the absorber mass.

2. The toolholder according to claim 1, further comprising a clearance gap between the rigid support member and the cover member for allowing relative movement between the cover member and the rigid support member along a longitudinal axis of the toolholder.

3. The toolholder according to claim 2, wherein the cover member exerts pressure against the first resilient support and the absorber mass is urged against the second resilient support, which is then urged against the rigid support member to provide compression of both the first resilient support and the second resilient support against the absorber mass as the cover member moves in a first direction, and wherein the cover member exerts less pressure against the first resilient support and the absorber mass is urged less against the second resilient support, which is then is urged less against the rigid support member to provide less compression of both the first resilient support and the second resilient support against the absorber mass as the cover member moves in a second direction.

4. The toolholder according to claim 1, wherein the dynamic absorber is proximate a front end of the toolholder.

5. The toolholder according to claim 1, wherein the dynamic absorber is proximate a rear end of the toolholder.

6. The toolholder according to claim 1, wherein the absorber mass includes a first end and a second end, and wherein the first resilient support member is proximate the first end, and wherein the second resilient support member is proximate the second end.

7. The toolholder according to claim 6, wherein the first resilient support member is positioned between the cover member and a first angled surface of the absorber mass, and the second resilient support member is positioned between the rigid support member and a second angled surface of the absorber mass.

8. The toolholder according to claim 1, wherein the dynamic absorber is in the form of an annular ring.

9. The toolholder according to claim 1, wherein the outer surface includes a ledge that abuts the rigid support member to prevent axial movement.

10. A toolholder comprising:
a body portion having an exterior surface;
a sleeve disposed about a portion of the exterior surface of the body portion; and
a dynamic absorber comprising an absorber mass, the dynamic absorber including a first resilient support member disposed between the sleeve and the absorber mass, and a second resilient support member disposed between the sleeve and the absorber mass,
wherein the sleeve is connected only to a portion of the toolholder, thereby creating a pivot point that causes the sleeve to move in opposite directions about the pivot point.

* * * * *